United States Patent [19]

Allan et al.

[11] 4,378,875
[45] Apr. 5, 1983

[54] SLING BELT BULK MATERIAL CONVEYOR

[75] Inventors: Kenneth N. Allan, Menomonee Falls; Thomas J. Worringer, Wauwatosa; Robert T. Baugh, Brookfield, all of Wis.

[73] Assignee: Allis-Chalmers Corporation, Milwaukee, Wis.

[21] Appl. No.: 217,587

[22] Filed: Dec. 18, 1980

[51] Int. Cl.³ .............................................. B65G 15/08
[52] U.S. Cl. ................................... 198/815; 198/823; 198/833
[58] Field of Search ............... 198/815, 818, 819, 823, 198/833

[56] References Cited

U.S. PATENT DOCUMENTS

| 826,312 | 7/1906 | Catlin | 198/818 |
|---|---|---|---|
| 843,018 | 2/1907 | Jamieson . | |
| 1,530,707 | 3/1925 | Warner . | |
| 1,970,842 | 8/1934 | Crossen . | |
| 2,656,035 | 10/1953 | Thomson et al. . | |
| 2,751,065 | 6/1956 | Thomson | 198/818 |
| 2,821,290 | 1/1958 | Duncan | 198/823 |
| 2,838,164 | 6/1958 | Duncan | 198/823 X |
| 2,925,903 | 2/1960 | Robbins | 198/818 |
| 3,381,799 | 5/1968 | Havelka | 198/823 |

FOREIGN PATENT DOCUMENTS

| 531393 | 10/1956 | Canada . | |
|---|---|---|---|
| 226080 | 9/1910 | Fed. Rep. of Germany . | |
| 2153389 | 10/1973 | Fed. Rep. of Germany . | |
| 1038262 | 9/1953 | France | 198/823 |
| 364512 | 2/1973 | U.S.S.R. | 198/823 |

Primary Examiner—Jeffrey V. Nase
Attorney, Agent, or Firm—Charles L. Schwab

[57] ABSTRACT

A sling belt conveyor has a pair of individually tensioned cables (209, 224) with transverse slings (51) pivotally connected to the cables (209, 224) which support a low tension conveyor belt (61) without being connected thereto. The belt (61) extends beyond the path of the support cables (209, 224) and is tensioned independently of the latter.

11 Claims, 13 Drawing Figures

SLING BELT BULK MATERIAL CONVEYOR

TECHNICAL FIELD OF THE INVENTION

This invention relates to belt conveyors and more particularly to sling belt conveyors for transporting bulk material long distances.

BACKGROUND OF THE DISCLOSURE

Early use of cables to carry and propel conveyor belts is shown in U.S. Pat. No. 826,312 wherein the belt is releasably attached to the cables in the working run and is detached from the cables at the ends of the working run. In this prior construction, the belt is carried on end idler pulleys independently of the cables which are carried by a pair of sheaves positioned beyond the end idler pulleys. This positioning of the cable sheaves at the end of the conveyor complicates unloading or discharge from the head end of the conveyor. Later belt conveyors having conveying belts supported on cables, but not secured thereto, are shown in Canadian Pat. No. 531,393; West German Pat. No. 2,153,389 and U.S. Pat. Nos. 843,018; 1,970,842; 2,656,035; 2,751,065 and 3,381,799. The use of carrying straps to suspend a conveyor belt between two support cables, wherein the straps are secured to both the cables and the belt, is shown in German Pat. No. 226,080 issued Sept. 26, 1910, and in U.S. Pat. No. 1,530,707.

In the sling belt conveyor of U.S. Pat. No. 2,925,903, spring type hangers are connected via hinges to opposite edges of a conveyor belt and fastened to suspension drive cables. The spring type hangers present potential resonance problems and a special belt and/or belt modifications are required. It will also be noted the direction of the load transmitted by the support cable to the intermediate support pulley does not pass through the plane of the support pulley.

SUMMARY OF THE INVENTION

The sling belt bulk conveyor of the present invention employs a pair of generally parallel cables carried on end sheaves and to which belt supporting slings are secured at predetermined intervals. The slings support and transport a low tension conveyor belt but are not fastened thereto. This not only allows the conveyor belt to be tensioned independently of the support cables and to be supported at its opposite ends by pulley disposed beyond the end sheaves for the support cables, but also allows the two support cables to be tensioned independently of one another. In the preferred embodiment of the invention each sling includes end hangers pivotally connected, respectively, relative to the support cables.

BRIEF DESCRIPTION OF THE DRAWINGS

Sling belt bulk material conveyors incorporating the present invention are illustrated in the drawings, in which.

DETAILED DESCRIPTION OF THE DRAWINGS

Figure 1:
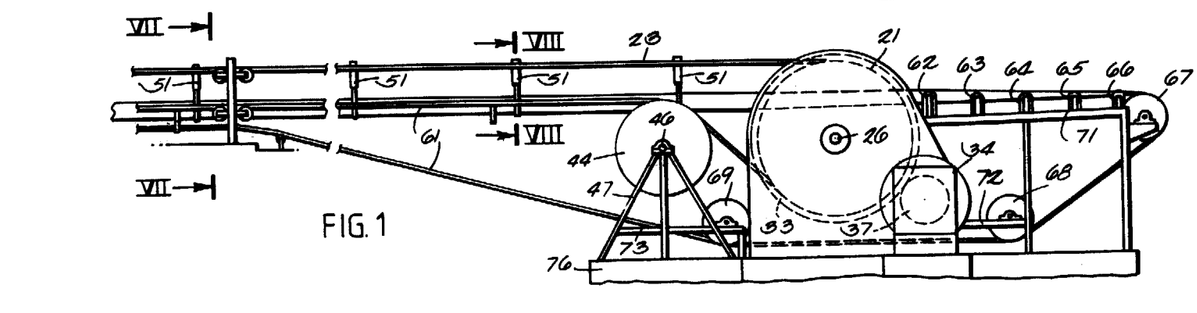
FIG. 1 is a side view of a drive end or head terminal of a sling belt conveyor.
Figure 2:
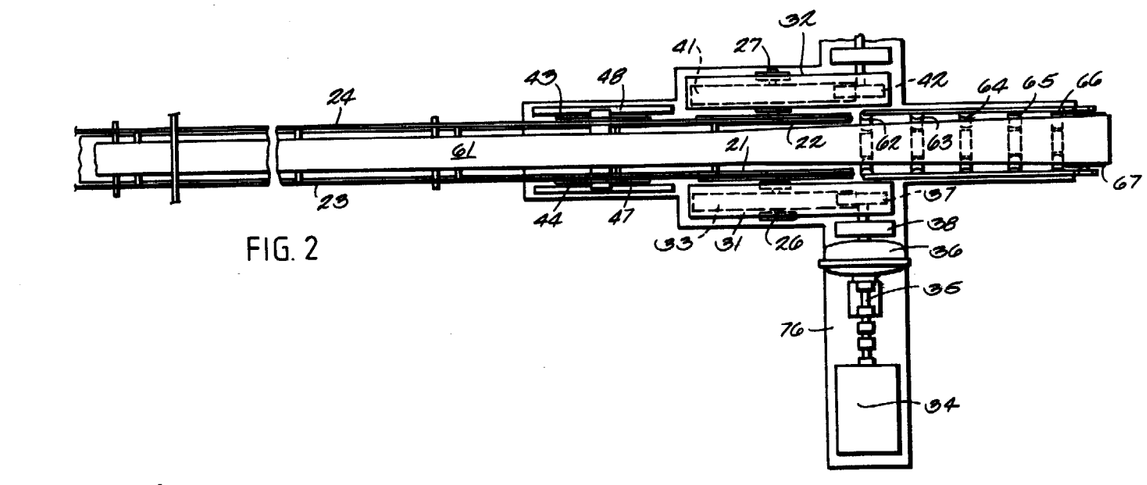
FIG. 2 is a top view of the structure shown in FIG. 1.
Figure 5:
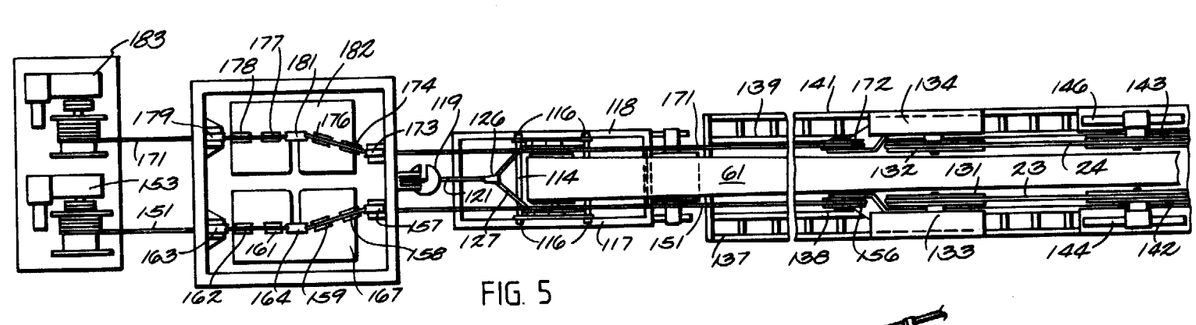
FIG. 5 is a top view of the structure shown in FIG. 3.
Figure 6:
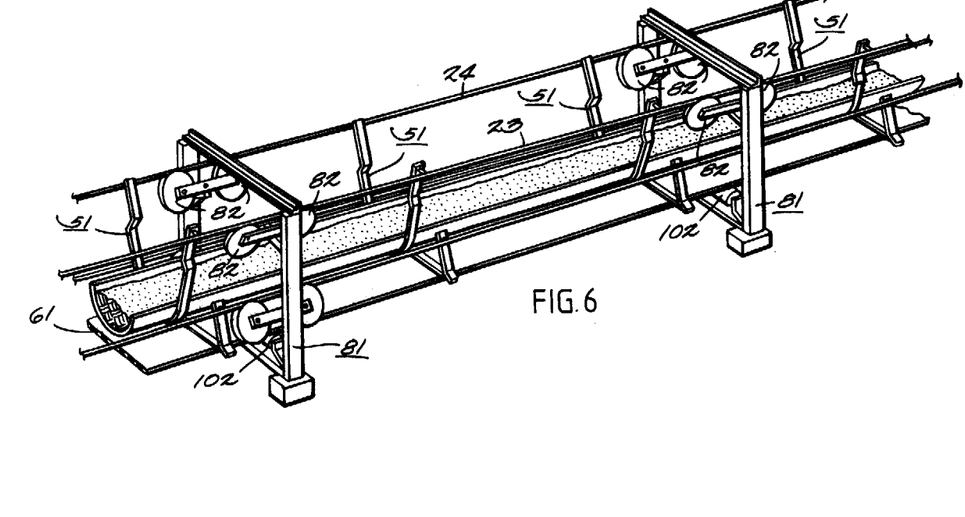
FIG. 6 is a perspective view of an intermediate portion of a sling belt conveyor.
Figure 7:
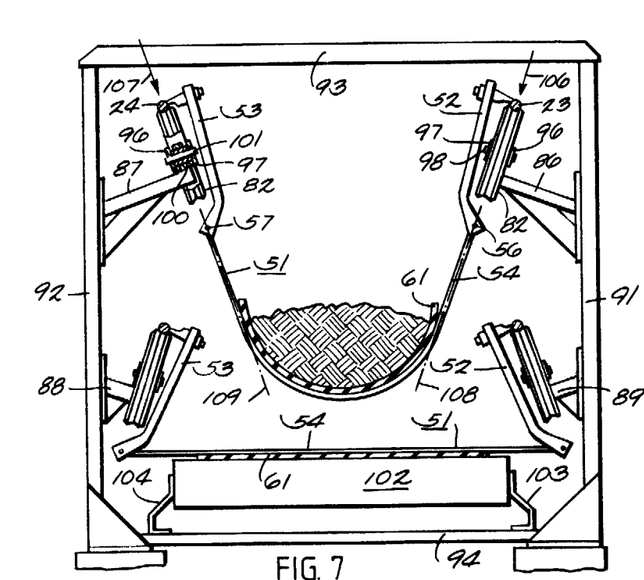
FIG. 7 is a section taken along the line VII—VII in FIG. 1.
Figure 8:
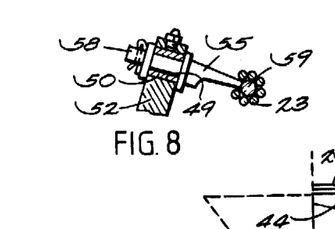
FIG. 8 is a section taken along the line VIII—VIII in FIG. 1.

A first embodiment of the present invention is shown in FIGS. 1-9 and a second embodiment is illustrated in FIGS. 10-13. The features illustrated in FIGS. 6, 7 and 8 are common to both embodiments. FIGS. 1 and 2 illustrate the drive or head terminal at the discharge end of the conveyor wherein a pair of drive sheaves 21, 22, about which support cables 23, 24 are reeved, are secured to separate shafts 26, 27, respectively, journalled in suitable bearings in housings 31, 32. The drive means for sheave 21 includes a driven gear 33 secured for rotation with the shaft 26 which is driven by power means in the form of an electric motor 34 through a drive train including a jack shaft 35, a variable fill fluid coupling or hydroviscous drive 36 and drive gear 37. Alternatively, a motor with soft start capability and speed control can be used as a replacement for the variable fill fluid coupling or hydroviscous drive 36. A holding brake 38 is also provided. A similar drive means for the cable drive sheave 22 is provided at the other lateral side of the conveyor which includes a driven gear 41 secured to the shaft 27 and a drive gear 42. A pair of idler sheaves 43, 44 are provided for the return runs of the cables 23, 24 to increase the cable wrap about the drive sheaves 21, 22. The idler sheaves 43, 44 are rotatably mounted on a transverse shaft 46 secured at its opposite ends to supports 47, 48. Referring also to FIGS. 7 and 8, a plurality of uniformly spaced transverse slings 51 have rigid hanger portions 52, 53 whose remote or outer ends are rotatably connected relative to the support cables 23, 24 through pivot studs 55. The inboard ends of each set of hanger portions 52, 53 are pivotally connected or hinged to a flexible strap 54 by hinge pins 56, 57. As shown in FIG. 8, the outermost ends of the hanger portion 52 includes a bore 49 in which a bushing-type bearing 50 is positioned. The pivot stud 55 has a reduced diameter cylindrical bearing part 58 in cooperative rotatable engagement with the bearing 50 and oppositely extending anchoring arms 59 which are inserted into the central part of the support cable 23. The slings 51 support the forwarding or working run of a low tension conveyor belt 61 and are operative to impart a concave troughed configuration thereto. The slings 51 are not physically attached to the belt 61, thus permitting the belt 61 to extend beyond the support cable end sheaves 21, 22. As seen in FIGS. 1 and 2, the belt 61 is carried by transition or troughing roller assemblies 62, 63, 64, 65, 66 in the transition zone between the point of support by the slings 51 and the end pulley 67. The extension of the conveyor belt 61 beyond the cable sheaves 21, 22 at the head terminal illustrated in FIGS. 1 and 2, facilitates unloading of bulk material carried by the belt 61. The troughing roll assemblies 62–66, end pulley 67 and a pair of belt idlers 68, 69 are mounted on support structures 71, 72, 73 which in turn are supported, along with housings 31, 32, motor 34 and supports 47, 48 on a concrete mounting pad 76.

Referring to FIGS. 6 and 7, the forwarding and return runs of the support or drive cables 23, 24 are carried on a plurality of intermediate stanchions or supports 81 generally equally spaced along the length of the cables. Each of the intermediate supports 81 includes two pairs of tandem mounted idler sheaves 82 for the working runs of the cables 23, 24. Additionally, every third stanchion includes two pairs of tandem mounted idler sheaves 82 for the return runs of the cables 23, 24. As shown in FIG. 7, four pairs of intermediate sheaves 82 are supported, respectively, on brackets 86, 87, 88, 89 welded to the associated upright posts 91, 92 which are interconnected at their tops and bottoms by transverse frame members 93, 94, respectively. Each pair of tandem mounted intermediate cable sheaves 82 are rotatably mounted on opposite ends of side-by-side walking beams 96, 97 by shafts 98. As shown in FIG. 7, the central portions of the walking beams 96, 97 are pivotably supported on their associated bracket by a bushing-type bearing 100 and a pivot pin 101. The flexible strap 54 of the slings 51 support the independently tensioned conveyor belt 61 in the upper, working run thereof and the lower, return run of the conveyor belt is supported by return idler rollers 102 rotatably supported on transversely spaced brackets 103, 104 secured to the lower frame members 94 of the supports 81. In the loaded condition of the conveyor, the direction of the load imposed by the cables 23, 24 on the sheaves 82, shown by arrows 106, 107 in FIG. 7, lie in the planes 108, 109 of the opposite, downwardly converging sheaves 82. It will be noted, the axes of the pins 56, 57 lie in the planes 108, 109. The downwardly converging, canted position of the intermediate sheaves 82, as viewed in FIG. 7, evenly load the walking beam and sheave bearings, thereby insuring even wear which optimizes the wear life of the bearings, sheaves, and cable. In other words, the lines of force 106, 107 are normal to the axes of the walking beam and intermediate sheave bearings.

Figures 3, 4:
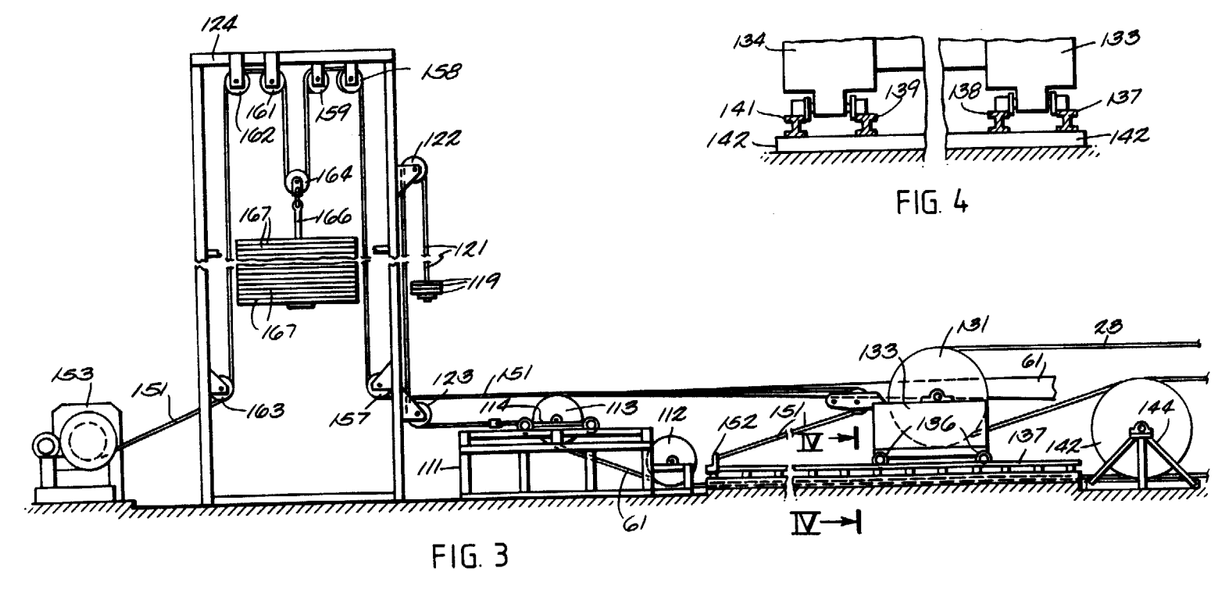
FIG. 3 is a side view of the nondriven, tail end of a sling belt conveyor showing a weight type tensioning means for the belt and cables.
FIG. 4 is a section taken on the line IV—IV in FIG. 3.

Referring to FIGS. 3, 4 and 5, the tail terminal at the loading end of the sling belt conveyor includes independent means for individually tensioning each of the endless cables 23, 24 and the endless conveyor belt 61. A stationary support frame 111 supports a fixed axis belt idler roller 112 and a shiftable axis end roller or pulley 113. The belt tensioning end pulley 113 is rotatably mounted on a carriage 114 having four single flange wheels 116 supported on parallel tracks 117, 118 on the top of the support frame 111, which tracks extend in the direction of the working run of the conveyor belt 61. The end pulley 113 is biased in a direction to tension the belt 61 by a plurality of stacked weight segments 119 suspended from one end of a cable 121, which is reeved about a pair of sheaves 122, 123 mounted on a tension tower 124 and has its other end connected to the carriage 114 through a connector 126 and a short pull cable 127 interconnecting laterally opposite sides of the carriage 114. The tension of the belt 61 may be varied by adding or removing one or more of the weight segments 119.

The endless support and conveying cables 23, 24 are reeved about end sheaves 131, 132 rotatably mounted on shiftable wheeled carriages 133, 134, respectively.

Each carriage has four single flange wheels 136, which run on parallel tracks 137, 138, 139, 141 on a stationary support structure 142.

A pair of fixed axis idler sheaves 142, 143 for the support cables 23, 24, respectively, are rotatably mounted on stationary supports 144, 146. The end sheave 131 is tensioned through a tensioning cable 151 having one end connected to a stationary anchor 152 and its other end secured to the drum of a motor driven cable winch unit 153. The tensioning cable 151 is reeved about cable sheaves 157, 158, 159, 161, 162, 163 on the tension tower 124 and about a support sheave 164 connected to a hanger 166 supporting vertically stacked weight segments 167. Similar individual tensioning means is provided for the end sheave 132 for the endless support and conveying cable 24. Specifically, a tensioning cable 171 is secured at one of its ends to the anchor 152, is reeved about a sheave 172 mounted on carriage 134, is reeved about sheaves 173, 174, 176, 177, 178, 179 mounted on the tension tower 124 and about a support sheave 181 connected by a hanger, not shown, to a stack of weight segments 182. The other end of the tensioning cable 171 is wound about and secured to a drum on a motor driven cable winch unit 183. The cable control units 153, 183 are individually controllable by means, not shown, to raise the weight segments 167, 182 to their illustrated suspended tensioning position in which the conveyor cables 23, 24 are placed under predetermined tension. The tension in the cables 23, 24 can be changed by changing the number of weight segments suspended by the tension cables 151.

Figure 9:
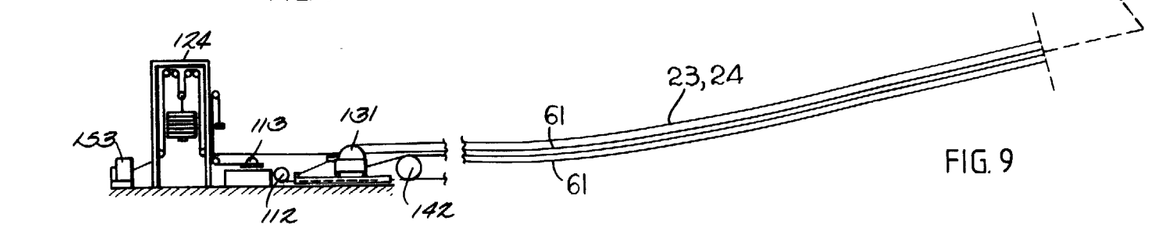
FIG. 9 is a schematic plan view of an entire sling belt conveyor using parts illustrated in FIGS. 1-8.

FIG. 9 schematically illustrates a sling belt conveyor system incorporating the structures shown in FIGS. 1–8. The low tension conveyor belt 61 can be tensioned to permit a slight sag in the belt between the points of support by the slings 51. The slight pockets so formed help prevent back sliding of bulk material when conveyed up substantial inclines. The belt sag between straps can be adjusted to accommodate different conveying conditions by adjusting the tension of the belt. The catenary shape of the loaded belt also helps hold the conveyed bulk material against back sliding.

Figure 10:
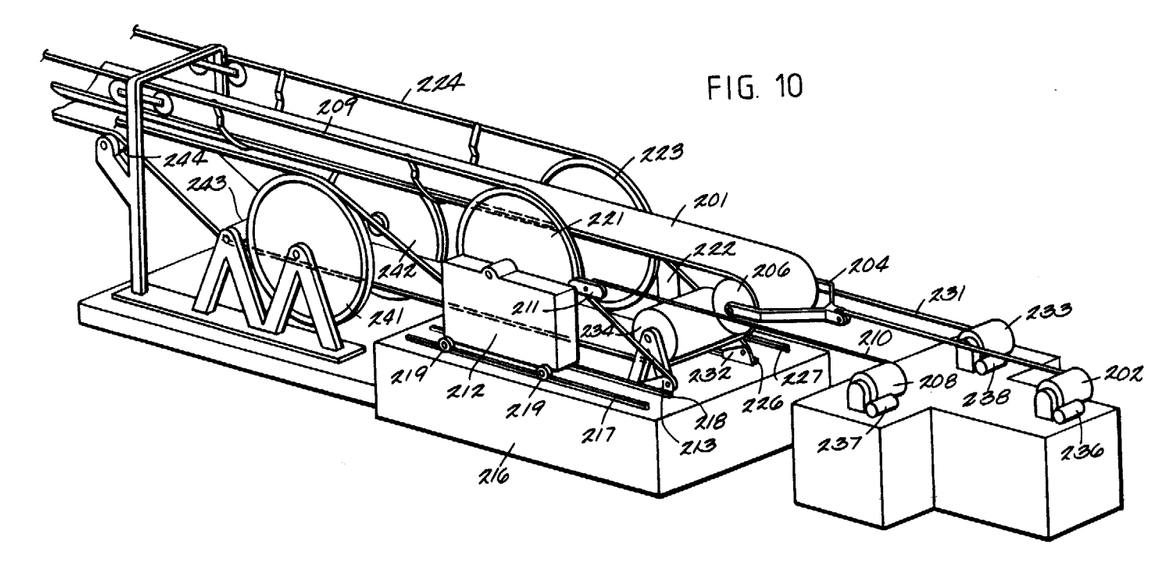
FIGS. 10, 11 and 12 show a tail terminal, a drive terminal and a head terminal, respectively, of a sling belt conveyor embodiment of the present invention.

In the embodiment of the invention shown in FIGS. 10–13, the tensioning of the low tension conveyor belt 201 is accomplished by a belt tension winch 202 whose cable 203 is secured to a clevis 204 on which an end roller 206 for the conveyor belt 201 is rotatably journalled. As shown in FIG. 10, illustrating the tail or loading terminal, a cable control unit in the form of a tensioning winch 208 is provided to individually tension the belt support and conveying cable 209. A tensioning cable 210 extends from a drum, not shown, of the winch 208, is reeved about a sheave 211 rotatably mounted on a carriage 212 and thence extends to an anchor 213 to which it is secured. The anchor 213 is secured to a stationary mounting pad 216, which also supports a pair of parallel tracks 217, 218, which support and guide four single flange wheels 219 rotatably mounted on the lower part of the carriage 212, rotatably supporting the cable end sheave 221 for rotation about a horizontal axis transverse to the direction of movement of the conveyor belt 201. The carriage 222 rotatably supporting the end sheave 223 for the other belt support and conveying cable 224 is similarly supported on tracks 226, 227 mounted on the support pad 216. The tensioning cable 231 for tensioning the support cable 224 is secured to an anchor 232 on the support mounting pad 216, is reeved about a sheave, not shown, on the carriage 222 and is wound about a drum, not shown, on a cable tension winch 233. The winches 202, 208, 233 are individually driven by individually controlled electric motors 236, 237 and 238, respectively. The tail terminal shown in FIG. 10 also includes a pair of idler sheaves 241, 242 for the support cables 209, 224 and idler rolls 243, 244 for the return run of the conveyor belt 201.

Figure 11:
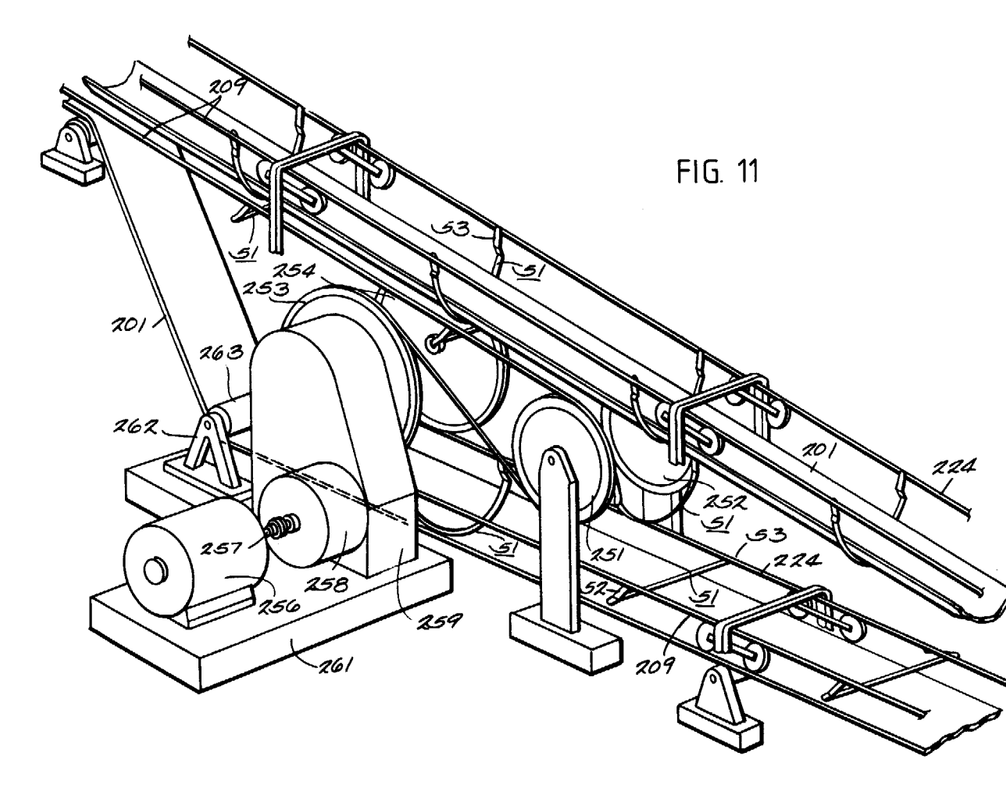

FIG. 11 illustrates a drive terminal or station, which is intermediate the opposite ends of the conveyor. The return runs of the support cables 209, 224 are reeved about idler sheaves 251, 252 and also about drive sheaves 253, 254. The drive sheave 253 for the support cable 209 is driven by drive means including an electric drive motor 256, a coupling 257, a hydroviscous drive unit 258 and a speed reducer 259. The motor 256 and speed reducer 259 are mounted on a stationary mounting pad 261 by conventional means, not shown. The pad 261 also supports a bracket 262 rotatably supporting one end of a belt idler 263. The drive pulley 254 is driven through drive means similar to that provided for drive pulley 253.

Figure 12:
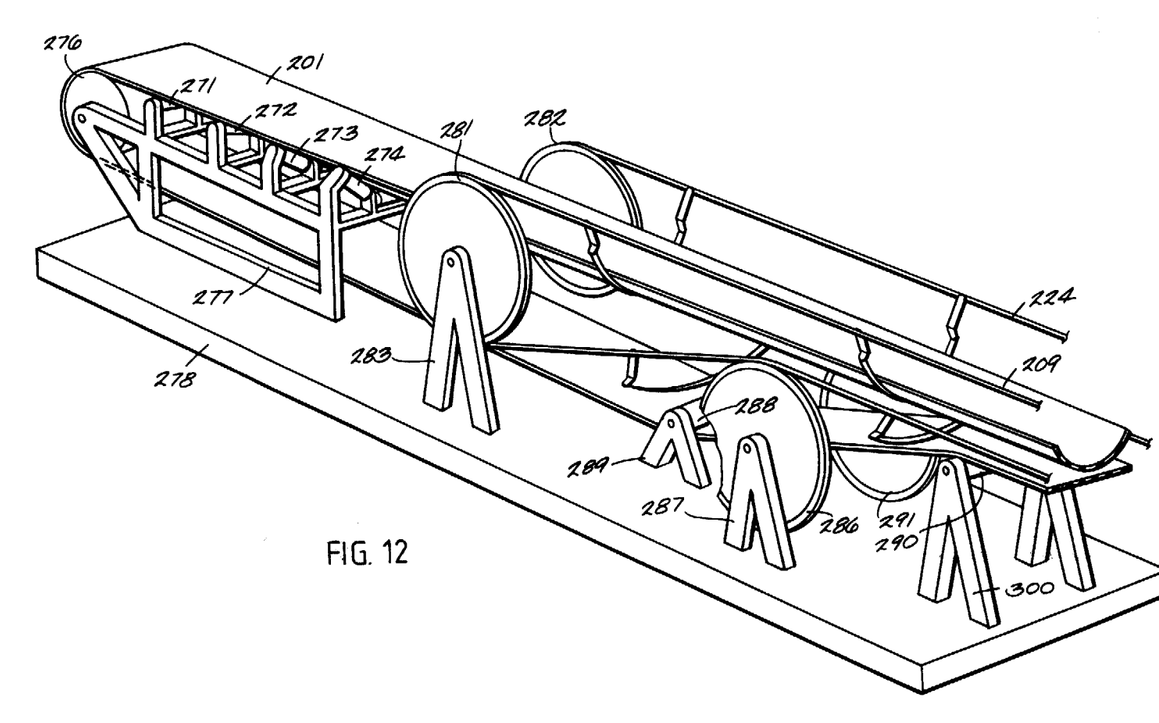

FIG. 12 illustrates a head or unloading terminal of the sling belt conveyor shown in FIGS. 10-13 wherein the conveyor belt 201 extends beyond the end sheaves 281, 282 for the support and conveying cables 209, 224, thereby simplifying the installation of transition or troughing roll assemblies 271, 272, 273, 274 and end pulley or roller 276 to provide a convenient unloading point for the conveyed bulk material. The troughing roll assemblies 271-274 and end roller 276 are rotatably supported on a support frame 277 secured to a suitable mounting pad 278. The end sheaves 281, 282 for the main cables 209, 224 are rotatably supported by suitable mounts such as mount 283 illustrated for sheave 281. A cable idler sheave 286 is rotatably supported on a mount 287 and corresponding ends of belt idler pulleys 288, 290 are rotatably supported on mounts 289, 300. The mounts 283, 287, 289 and 300 are secured by suitable fastening means, not shown, to the mounting pad 278. The sheaves 282 and 291 are rotatably supported on mounts, not shown, in a manner similar to the mounting of sheaves 281 and 286. Also, the opposite end of belt idlers 288, 300 are rotatably supported on mounts, not shown, similar to mounts 289, 300.

Figure 13:
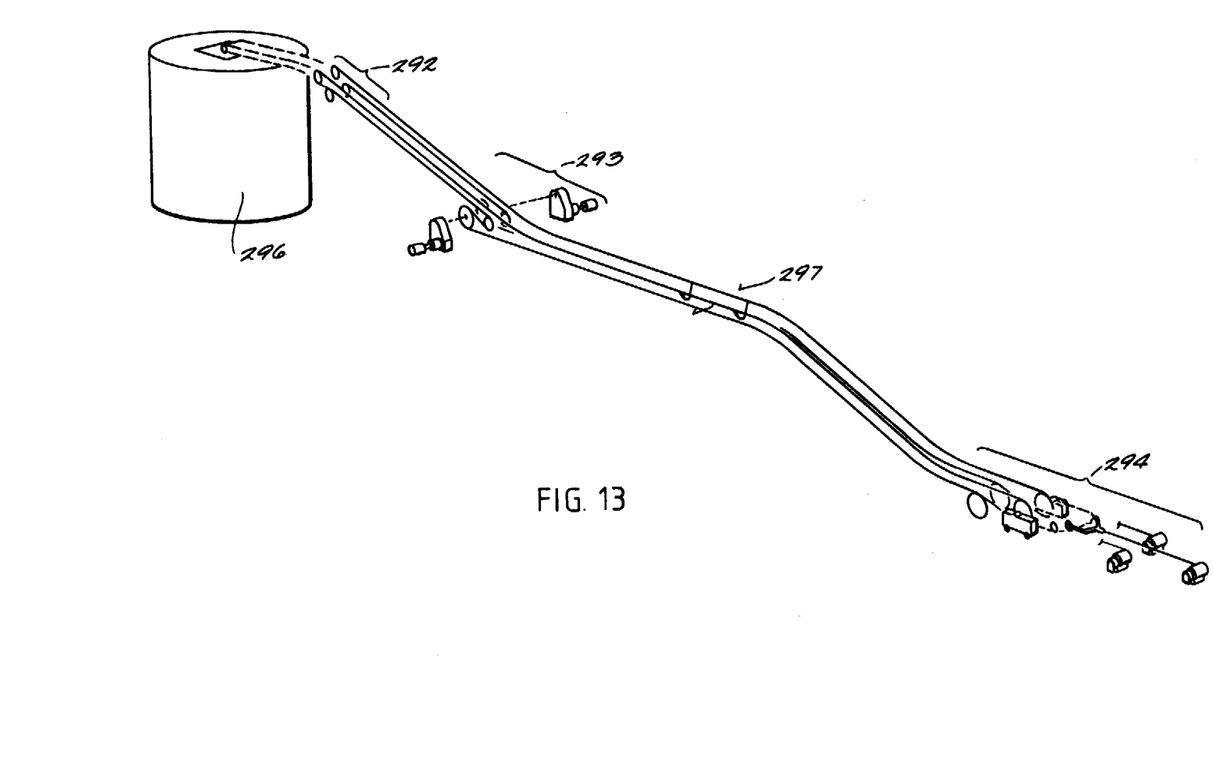
FIG. 13 is an aerial view of a complete conveyor system incorporating the portions shown in FIGS. 10, 11 and 12.

The conveyor schematically shown in FIG. 13 includes the head, drive and tail terminals 292, 293, 294 similar to those shown in FIGS. 10, 11 and 12. As illustrated, the bulk material being loaded onto the belt at the tail terminal 294 is delivered to a storage silo 296 by the head terminal 292 at a higher elevation. The intermediate portion 297 of the conveyor is of the same construction as that shown in FIG. 6.

OPERATION

Bulk material is loaded onto the low tension conveyor belt at its tail terminal by any suitable feeder means, not shown. The sets of parallel support cables 23, 24 and 209, 224, which have coextensive, parallel forwarding (working) runs situated at substantially the same elevation, are tensioned to a greater extent than the belts 61 and 201 which they support. The slings 51 attached to the support cables provide both support and transportation for the working run of the nondriven belts. The flexible straps 54 of the slings are made of flat, relatively soft material so as not to damage the conveyor belts. The slings provide a natural catenary shape which provides increased load carrying capacity and may facilitate navigation of horizontal curves. Since the belt does not serve to drive the conveyor and is not attached to the slings, it may be a standard low cost, low tension belt which can be replaced in a minimal amount of time, with a minimal number of man-hours work and at a reasonable cost. As is well known, the cost of the conveyor belt represents in the neighborhood of fifty percent or more of the cost of a long distance conveyor. The present invention uses a low tension belt, which is much less costly than the more highly reinforced high tension belt, resulting in a lower cost long distance conveyor. Since the present invention uses relatively soft sling straps, which have a very low wear effect on the belt, long service life for the belt can be anticipated. Also, the life of the belt is extended because its underside is not engaged by support idlers except at the head and tail terminals.

A predetermined low tension is chosen for the conveyor belt so as to allow the belt to sag between slings. The sags between slings move with the belt, (and are stationary relative to the conveyed material), thus permitting the belt to transport bulk material up steeper inclines than would be the case of a more highly tensioned belt such as those serving to transmit power for conveying the bulk material. Also of importance in providing capability of the belt to convey up steep inclines, is the cross-section shape of the loaded belt as suspended by the slings. As will be noted in FIG. 6, the laterally opposite belt edges are at an approximate 70 degree inclination in the loaded condition of the belt 61. In this condition, the belt sides exert an inward compacting force on the material, which increases friction of the material relative to the belt and the friction within the conveyed bulk material. This results in a markedly reduced tendency of the material to backslide when conveyed up inclines. In belt conveyors using troughing roll assemblies for supporting the belt, the troughing rolls are normally positioned at inclines of only 35 to 45 degrees.

Support cables are more suitable for highly tensioned applications than reinforced conveyor belts, thus permitting longer conveyor flights. Also, cables are more amenable to intermediate drives than are reinforced belts thus further facilitating the use of long conveyor flights, which are becoming more important as additional open pit coal and mineral deposits are mined. The belt conveyor of the present invention may be operated at substantially higher speeds than a tensioned belt supported on troughing roll assemblies because in the latter the belt follows an undulatory path as the loaded belt rides over the troughing roll assemblies, thus limiting the speed. Because of the energy required to move the loaded belt over each troughing roll assembly, such prior art conveyors require more energy to operate than the present conveyor requires in performing the same conveying task.

In summary, the present invention provides a high speed, high capacity conveyor for relatively steep incline and long conveyor flight applications. The present conveyor is believed to be lower in cost, to require less power to operate and to be easily serviced and repaired so as to have minimum "down time". The present conveyor is also believed to be less costly to install. During operation one of the support cables may stretch more than the other. The present invention accommodates this otherwise troublesome operational characteristic by provision of means to individually tension the support cables. As illustrated, the drive sheaves for the support cables are driven by separate drive means, which are controlled by means, not shown, to provide proper synchronization for controlling relative sling offset.

The embodiments of this invention in which an exclusive property or privilege is claimed are defined as follows:

1. A conveyor including a pair of endless support cables each having a forwarding run and a return run between longitudinally spaced tail and head ends of said conveyor, said forwarding runs being substantially coextensive and situated at substantially the same elevation and support means supporting said support cables for respective movement along endless paths described by said support cables, said conveyor characterized by
   a plurality of transverse slings arranged at longitudinally spaced intervals along said endless support cables each sling including an intermediate flexible transverse strap and a pair of relatively rigid hangers with first corresponding ends connected, respectively, to the opposite transverse ends of said strap and second corresponding ends pivotally connected, respectively, to said support cables at fixed transversely aligned points therealong for pivotal movement about axes transverse to the axes of said cables,
   an endless flexible conveyor belt having a working run and a return run said working run being supported without attachment on said straps in the forwarding run of said support cables,
   end rollers supporting said endless belt at the opposite ends of said conveyor, and
   intermediate rollers at spaced intervals supporting the return run of said conveyor belt.

2. The conveyor of claim 1 wherein said end roller at one end of said conveyor is disposed a substantial distance in the longitudinal direction of the conveyor beyond the path of said support cables.

3. The conveyor of claim 2 wherein said end roller at the other end of said conveyor is disposed a substantial distance in the longitudinal direction of the conveyor beyond the path of said support cables.

4. The conveyor of claim 1 and further comprising end sheaves at opposite ends of said conveyor for each of said support cables, a first tensioning means operatively associated with one of said support cables and a second tensioning means operatively associated with the other of said support cables, said first and second tensioning means being independently operable to individually tension said support cables.

5. The conveyor of claim 4 and further comprising third tensioning means operatively associated with said conveyor belt for tensioning the latter independently of tensioning of said support cables.

6. The conveyor of claims 4 or 5 wherein said first and second tensioning means are connected, respectively, to said end sheaves for said support cables at one end of said conveyor.

7. The conveyor of claims 4 or 5 wherein said third tensioning means is connected to the end roller for said conveyor belt at the beginning of the working run of the latter.

8. The conveyor of claim 5 wherein said first, second and third tensioning means are at one end of said conveyor.

9. The conveyor of claim 8 wherein said one end of said conveyor is the tail end of said conveyor.

10. A conveyor including a pair of endless support cables each having a forwarding run and a return run between longitudinally spaced tail and head ends of said conveyor, said forwarding runs being substantially coextensive and situated at substantially the same elevation and support means supporting said support cables for respective movement along endless paths described by said support cables, said conveyor characterized by
    a plurality of transverse slings arranged at longitudinally spaced intervals along said endless support cables, each sling including an intermediate flexible transverse strap and a pair of rigid hangers with first corresponding ends connected, respectively, to the opposite transverse ends of said strap for pivotal movement about longitudinally disposed axes and second corresponding ends pivotally connected, respectively, to fixed transversely aligned points on said support cables by pivot means for pivotal movement relative to said cables, and
    an endless flexible conveyor belt having a working run and a return run, said working run being supported by said straps without attachment thereto in the forwarding run of said support cables.

11. A conveyor including a pair of endless support cables each having a forwarding run and a return run between longitudinally spaced tail and head ends of said conveyor, said forwarding runs being substantially coextensive and situated at substantially the same elevation and support means supporting said support cables for respective movement along endless paths described by said support cables, said conveyor characterized by
    a plurality of transverse slings arranged at longitudinally spaced intervals along said endless support cables, each sling including an intermediate flexible transverse strap and a pair of rigid hangers with first corresponding ends connected, respectively, to the opposite transverse ends of said strap and second corresponding ends pivotally connected, respectively, to fixed transversely aligned points on said support cables by pivot means for pivotal movement about axes generally transverse to the axes of said cables, and
    an endless flexible conveyor belt having a working run and a return run, said working run being supported by said straps without attachment thereto in the forwarding run of said support cables.

* * * * *